(12) United States Patent
Cho et al.

(10) Patent No.: US 12,311,787 B2
(45) Date of Patent: May 27, 2025

(54) CHARGING DOOR DEVICE FOR VEHICLE

(71) Applicants: Hyundai Motor Company, Seoul (KR); Kia Corporation, Seoul (KR)

(72) Inventors: Hyeon Woo Cho, Hwaseong-si (KR); Seung Jun Yang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 831 days.

(21) Appl. No.: 17/528,603

(22) Filed: Nov. 17, 2021

(65) Prior Publication Data

US 2022/0332199 A1 Oct. 20, 2022

(30) Foreign Application Priority Data

Apr. 15, 2021 (KR) .................. 10-2021-0048884

(51) Int. Cl.
*B60L 53/16* (2019.01)
*H01R 13/447* (2006.01)

(52) U.S. Cl.
CPC ............ *B60L 53/16* (2019.02); *H01R 13/447* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 9,071,020 B2 * | 6/2015 | Temmesfeld | B60L 53/16 |
| 10,577,845 B2 * | 3/2020 | Herczeg | E05D 15/10 |

FOREIGN PATENT DOCUMENTS

| | | | | |
|---|---|---|---|---|
| CN | 111284573 A | * | 6/2020 | B60L 53/16 |
| CN | 111347874 A | * | 6/2020 | |
| CN | 111605628 A | * | 9/2020 | B60L 53/16 |
| CN | 111791724 A | * | 10/2020 | |
| DE | 102019100787 A1 | * | 7/2020 | B60K 15/05 |
| KR | 20210012373 A | * | 2/2021 | |

* cited by examiner

*Primary Examiner* — Tho D Ta
(74) *Attorney, Agent, or Firm* — Slater Matsil, LLP

(57) ABSTRACT

An embodiment charging door device for a vehicle includes a charging-port door part configured to shield a charging part and to be rotatably coupled in a housing provided with the charging part, and an actuator coupled with a rotation shaft part provided in the charging-port door part and configured to rotatably move the charging-port door part to an open position or a closed position.

20 Claims, 9 Drawing Sheets

CHARGING DOOR DEVICE FOR VEHICLE

CROSS-REFERENCE TO RELATED APPLICATIONS

This application claims the benefit of Korean Patent Application No. 10-2021-0048884, filed on Apr. 15, 2021, which application is hereby incorporated herein by reference.

TECHNICAL FIELD

The present disclosure relates to a charging door device for a vehicle.

BACKGROUND

In general, electric vehicles (EVs) are being actively researched since the EVs are the most probable alternative to solving future automobile pollution and energy issues. In the meanwhile, in the US and Europe, dissemination of such EVs will become mandatory as the Air Conservation Act is enacted.

Accordingly, interest and research on green cars are also being actively conducted in Korea as a part of low-carbon green growth policies.

Such EVs are vehicles that obtain power by driving AC or DC motors, mainly using battery power, and are largely classified into battery-dedicated EVs and hybrid EVs. Here, the battery-dedicated EV drives the motor using battery power and the battery is recharged when the power is exhausted and, and the hybrid EV operates the engine and generates electricity to charge the battery and may be moved by driving the electric motor using such electricity.

On the other hand, to expand the dissemination of electric vehicles, it is essential to build a charging infrastructure for charging the EVs. For charging, an inlet is provided in a body of the EV, and a connector of an electric vehicle charging device is provided at the charging station, the connector being selectively coupled with the inlet in order to transfer the electrical energy to the EV.

Typically, the inlet of an electric vehicle is provided with a cover, which may protect the inside of the inlet from exposure to environmental elements such as rain or snow, and with a charging-port door covering the entire charging part of the vehicle body.

As a conventional art, there is a structure in which an integrated inlet cover, being combined with a charging-port door and an inlet cover, is applied to protect a charging part, or in which a charging-port door and an inlet cover, being separated, are used to perform an open and close operation using respective actuators.

However, when the integrated inlet cover is applied, there is a problem in that the charging-port door made of plastic material is deformed due to moisture, heat, and the like, whereby the inlet cover may not be mounted on the inlet, resulting in excessive field claims.

In addition, when open and close operations of the separate charging-port door and the inlet cover are performed using respective actuators and also in the case that protrusion of the charging-port door is large, interference with the charging gun may cause damage to the charging-port door. In addition, in the case that a hinge is long, it is difficult to regulate fluctuation during the open and close operation, and there is a problem in that the cost is excessively increased.

The foregoing is intended merely to aid in the understanding of the background of the present disclosure and is not intended to mean that the present disclosure falls within the purview of the related art that is already known to those skilled in the art.

SUMMARY

The present disclosure relates to a charging door device for a vehicle. Particular embodiments relate to a charging door device for a vehicle, the charging door device being configured such that one side of a charging door has a structure that is inserted into an inner side of a housing when the charging door is opened, thereby preventing damage to the charging door due to collision with a charging gun in advance.

Accordingly, embodiments of the present disclosure keep in mind problems occurring in the related art, and an embodiment of the present disclosure provides a charging door device for a vehicle. In this case, when the charging door is opened by an operation of an actuator, an upper-end part of a charging door matched to a rear surface of an outer garnish may be inserted into an inner side of a housing by rotation, and only a lower-end part of the charging door matched to a front surface of an inner garnish is allowed to protrude to the outside of the housing, whereby an area of the charging door protruding to the outside may be reduced. Accordingly, damage to the charging door due to interference with the charging gun during charging may be prevented from occurring.

In order to achieve the above objective, according to one embodiment of the present disclosure, there may be provided a charging door device for a vehicle, the charging door device including a charging-port door part configured to shield a charging part and to be rotatably coupled in a housing provided with the charging part, and an actuator coupled with a rotation shaft part provided in the charging-port door part and configured to rotatably move the charging-port door part to an open or a closed position.

Here, the housing may include a body having the charging part located therein and the actuator coupled therewith, and a garnish coupled with a front surface edge of the body.

Such garnish may include an inner garnish coupled with the front surface edge of the body and an outer garnish coupled with a front surface of the inner garnish.

In addition, the outer garnish may be formed in the same shape as the inner garnish and may be coupled such that a step is formed between the outer garnish and an upper side of the inner garnish.

In addition, the outer garnish may include a plurality of clips at positions facing the inner garnish, wherein the inner garnish comprises latching protrusions allowing the plurality of clips to be latched therewith, thereby allowing the outer garnish to be detachably coupled with the front surface thereof.

In addition, the charging-port door part may include a door having a shape corresponding to an inner shape of the outer garnish and coupled with the rotation shaft part at a rear surface thereof, and a coupling guide protrudingly formed along an upper edge of the door to be disposed on the upper side relative to a coupling position of the rotation shaft part.

Meanwhile, the charging door device may further include a sealing member coupled with the charging-port door part and forming a watertight structure for the housing, wherein the sealing member may further include a first sealing part coupled with the coupling guide and disposed on the upper edge of the door, the first sealing part being matched with a rear surface of the outer garnish at a closed position of the door, and a second sealing part integrally connected to the first sealing part and disposed on a lower edge of the door, the second sealing part being matched with a front surface of a protruding member protrudingly formed inward along a lower edge of the inner garnish at the closed position of the door.

In addition, the rotation shaft part may include a first coupling part disposed to surround a panel hinge part fixed by being fastened at one side of the housing, and rotatably coupled with the panel hinge part, and a second coupling part connected to the actuator at the other side of the housing and configured to transfer to the first coupling part a rotational force generated as the actuator is driven.

In addition, when the charging-port door part is rotatably moved to an open position, an upper-end part thereof is inserted into an inner side of the housing, and a lower-end part thereof protrudes to an outside of the housing.

When the charging door is opened by the operation of the actuator, an upper-end part of a charging door, which is matched with a rear surface of an outer garnish, is allowed to be inserted into the inner side of a housing by rotation, and only a lower-end part of the charging door, which is matched with a front surface of the inner garnish, is allowed to protrude to the outside of the housing. As a result, embodiments of the present disclosure have an effect of reducing an area of the charging door protruding to the outside.

Accordingly, in embodiments of the present disclosure, when the charging door is opened for charging, the protruding area can be reduced, so that damage due to collision with the charging gun can be prevented.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings.

Benefits and features of embodiments of the present disclosure, and a method of achieving the same, will become obvious with reference to the embodiments described later in detail together with the accompanying drawings.

However, the present disclosure is not limited by the embodiments disclosed below but will be implemented in various different forms. In this connection, the present embodiments are provided to make the disclosure of the present disclosure perfect and to completely inform the scope of the present disclosure to a person of ordinary knowledge in a related art to which the present disclosure pertains. Accordingly, the present disclosure is only defined by the scope of the claims.

In addition, in describing embodiments of the present disclosure, when it is determined that related well-known technologies may obfuscate the subject matter of the present disclosure, detailed descriptions thereof will be omitted.

Figure 1:
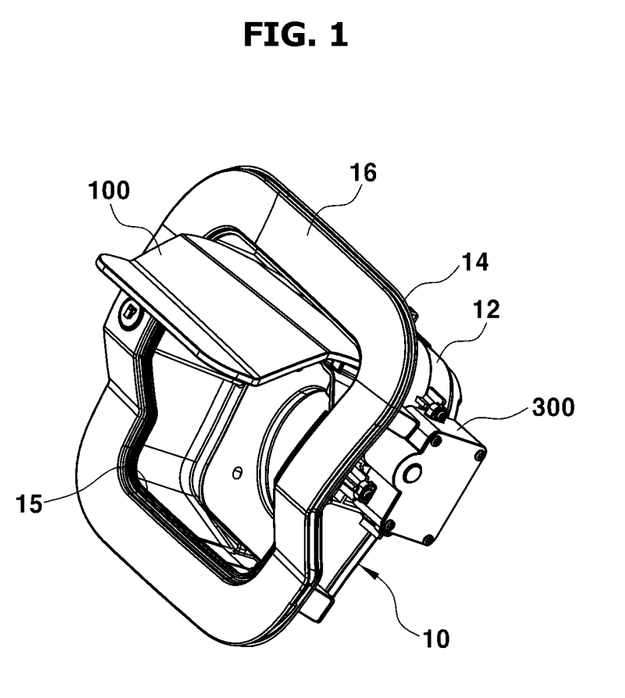
FIG. 1 is a view in order to schematically show a charging door device for a vehicle according to an embodiment of the present disclosure.
Figure 2:
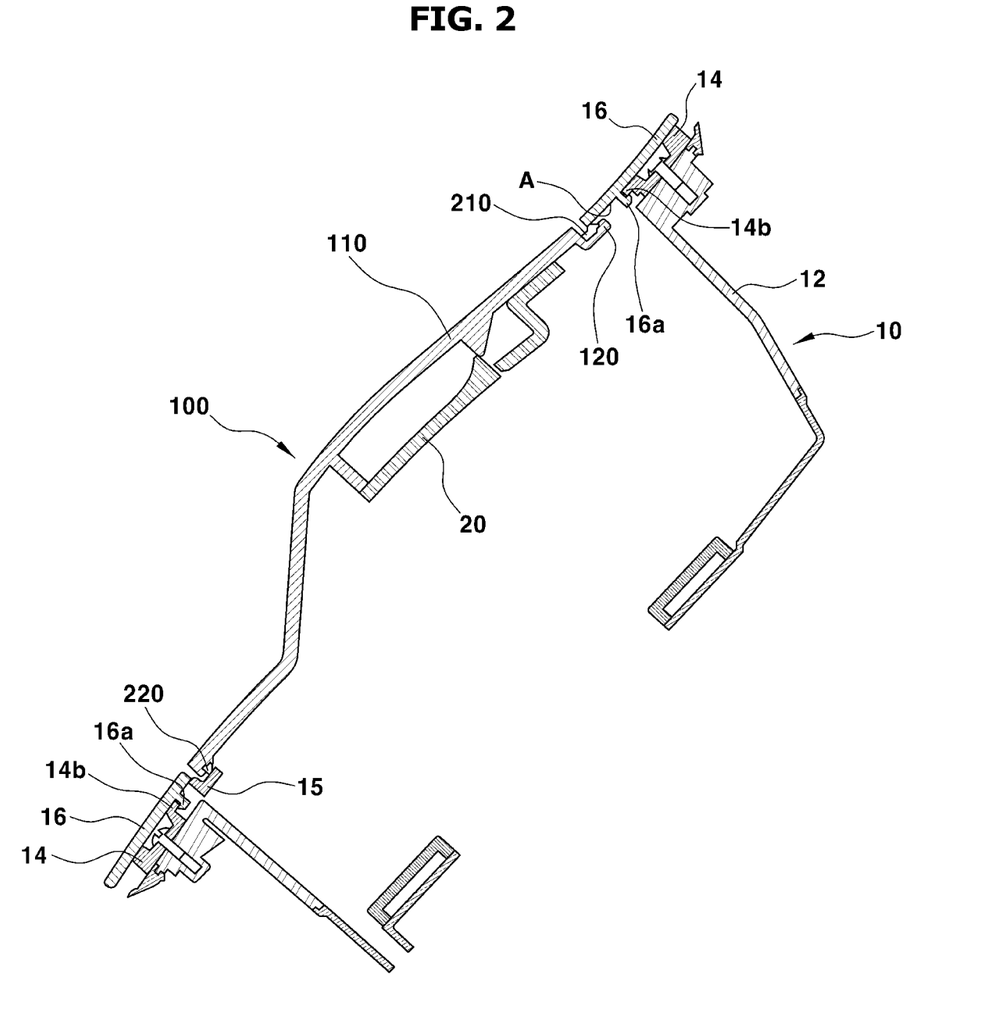
FIG. 2 is a view in order to show a structure for the charging door device for the vehicle according to an embodiment of the present disclosure.
Figure 3:
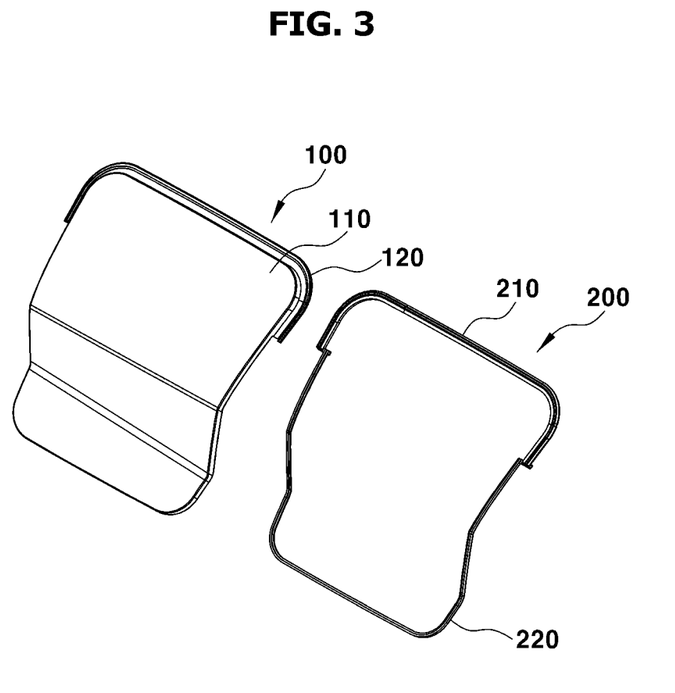
FIG. 3 is a view in order to show a charging-port door part for the charging door device for the vehicle according to an embodiment of the present disclosure.

FIG. 1 is a view in order to schematically show a charging door device for a vehicle according to an embodiment of the present disclosure, FIG. 2 is a view in order to show a structure for the charging door device for the vehicle according to an embodiment of the present disclosure, and FIG. 3 is a view in order to show a charging-port door part for the charging door device for the vehicle according to an embodiment of the present disclosure.

Figure 4:
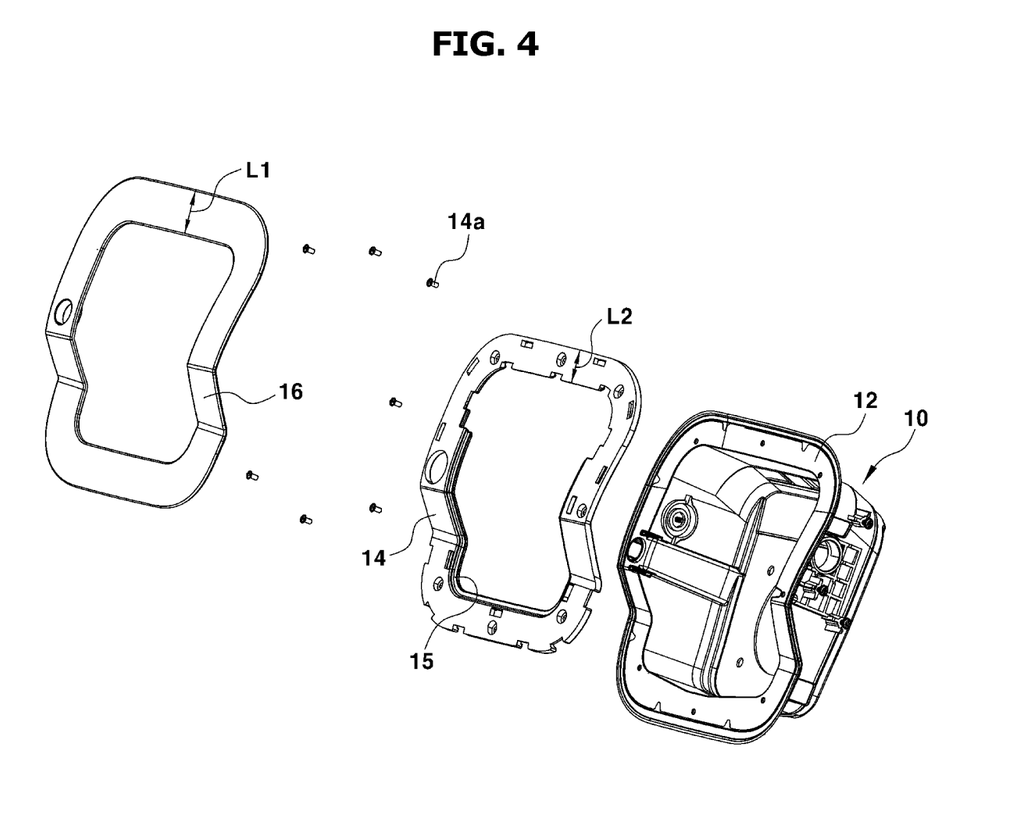
FIG. 4 is a view in order to show a separated status of an inner garnish and an outer garnish for the charging door device for the vehicle according to an embodiment of the present disclosure.
Figure 5:
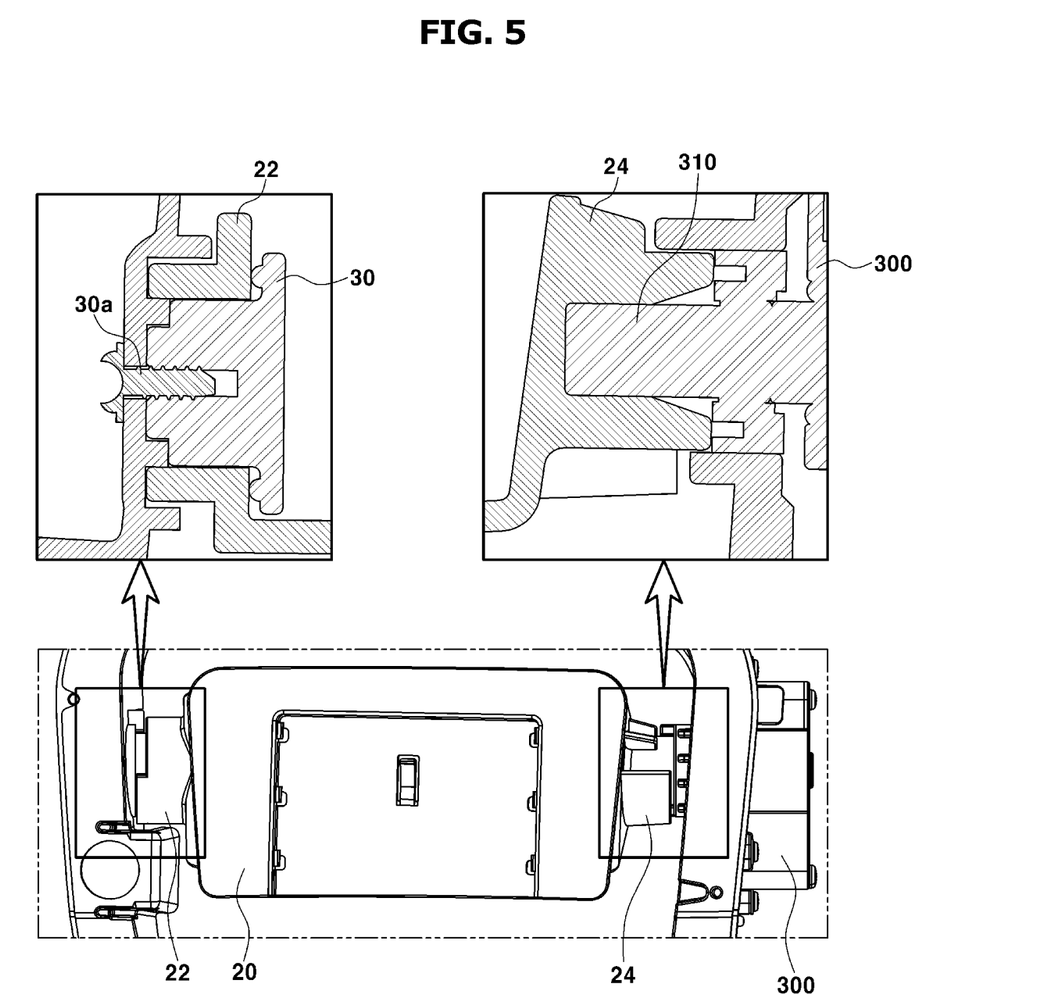
FIG. 5 is a view in order to show a coupling status of a rotation shaft and an actuator for the charging door device for the vehicle according to an embodiment of the present disclosure.

In addition, FIG. 4 is a view in order to show a separated status of an inner garnish and outer garnish for the charging door device for the vehicle according to an embodiment of the present disclosure, FIG. 5 is a view in order to show a coupling status of a rotation shaft and an actuator for the charging door device for the vehicle according to an embodiment of the present disclosure, and FIGS. 6 to 9 are views in order to show an operation of the charging-port door part for the charging door device for the vehicle according to an embodiment of the present disclosure.

As shown in FIGS. 1 to 2, the charging door device for the vehicle according to the present embodiment includes a charging-port door part 100, a sealing member 200, and an actuator 300.

The charging-port door part 100 shields the charging part configured to perform electric charging and is rotatably coupled in a housing 10 provided with the charging part.

The charging-port door part 100 includes a door 110 and a coupling guide 120 as shown in FIG. 3.

The door 110 is formed in a shape corresponding to a front shape of the housing 10, specifically a shape of an inner garnish 14 or an inner shape of an open outer garnish 16, and has a rotation shaft part 20 coupled at a rear surface thereof.

The door 110 may include at least one bent surface so as to correspond to the shape of an outer frame of the vehicle in a closed position.

In addition, though the door 110 is shown to have a square shape so as to correspond to the shape of the housing 10, this is only an example and is not fixed. That is, the door no may have other shapes such as a circle according to the shape of the housing 10.

In addition, the door 110 may be rotated to an open position or a closed position on the basis of the rotation shaft part 20, as the rotation shaft part 20 coupled with the inside of the housing 10 rotates.

The coupling guide 120 is protrudingly formed along with an upper edge corresponding to an upper side of the door 110 in the door 110 preset to the upper or lower side on the basis of a coupling position of the rotation shaft part 20.

The coupling guide 120 is formed to have a predetermined width and length so as to correspond to the thickness of the sealing member 200 and is installed to protrude from the upper edge of the door no.

That is, a configuration of the coupling guide 120 is added to the upper edge of the door 110, thereby allowing the sealing member 200 to be fixedly disposed on the door no. This is to allow the sealing member 200 to be positioned by being latched with the rear surface of the outer garnish 16, at the closed position of the door 110, thereby achieving a watertight structure for the upper side of the housing 10 (see FIG. 2).

The housing 10 includes a body 12 that is to be provided with a charging part, and the inner garnish 14 and the outer garnish 16 are provided at the body 12 so as to be possible to be latched, at the closed position of door no.

Here, the inner garnish 14 is disposed on the edge of the front surface of the body 12 and may be fixed to the housing 10 by being coupled with the front surface of the body 12 by allowing a plurality of fastening members 14a to be passed therethrough.

The inner garnish 14 may be provided with a protruding member 15 protrudingly formed inwards along with a lower edge, thereby guiding the door 110 to the closed position thereof. In this case, the sealing member 200 may be allowed to be matched with the protruding member 15. That is, when the door 110 moves from the open position to the closed position, a lower portion of the door 110, together with the sealing member 200, may be allowed to be latched with the protruding member 15, thereby achieving a watertight structure for the housing 10 (see FIG. 2).

In addition, the outer garnish 16 is formed to correspond to the size and shape of the inner garnish 14 and is coupled with the front surface of the inner garnish 14.

The outer garnish 16 is provided with a plurality of clips 16a protruding in a direction facing the inner garnish 14, and such clips 16a are latchedly positioned with latching protrusions 14b of the inner garnish 14.

The latching protrusions 14b are provided to correspond to the positions and numbers of the clips 16a. Thus the outer garnish 16 may be allowed to insert the plurality of clips 16a into the latching protrusions 14b, respectively, in a forced-insertion manner, thereby being able to be detachably coupled in the inner garnish 14.

Accordingly, the outer garnish 16, in a state of being coupled with the inner garnish 14, may be separated from the fixed inner garnish 14 only by an action pulling outward therefor without extra equipment.

In the case of the inner garnish 14, as shown in FIG. 4, the inner garnish 14 is coupled and fixed to the housing 10 through the fastening members 14a. This is to allow the outer garnish 16 to be coupled in the manner above and thus to be able to perform a role as a cover that prevents the fastening members 14a from being exposed to the outside.

In addition, after the outer garnish 16 is easily removed, the inner garnish 14 and the housing 10 may be sequentially separated by removing the fastening members 14a, whereby maintenance may be effectively performed.

Meanwhile, in coupling the outer garnish 16 with the inner garnish 14, the outer garnish 16 has the upper width L1 that is formed longer than the upper width L2 of the inner garnish 14, whereby a step is formed at an inner surface thereof (see FIG. 4).

That is, as seen with reference to FIG. 2, since the width L1 of the upper part of the outer garnish 16 is made to be longer than the width L2 of the upper part of the inner garnish 14, when the door 110 moves from the open position to the closed position, the upper portion of the door 110, together with the sealing member 200, is latchedly positioned on the step surface A. As a result, a watertight structure for the housing 10 may be formed.

Accordingly, when the door 110 moves from the open position to the closed position, the door 110 moves to have the upper part latchedly positioned on the step surface A inside the housing 10 and the lower part latchedly positioned on the protruding member 15 from the outside of the housing 10. Accordingly, the door 110 moved to the closed position may be physically fixed to the position thereof.

Meanwhile, the sealing member 200 is coupled with the charging-port door part 100 and forms a watertight structure with respect to the housing 10.

As shown in FIG. 3, the sealing member 200 includes a first sealing part 210 and a second sealing part 220.

The first sealing part 210 is coupled with the coupling guide 120 and disposed on the upper edge of the door 110 and is matched with the rear surface of the outer garnish 16. More specifically, the stepped surface A of FIG. 2, at the closed position of the door no.

The first sealing part 210 may be made of an elastic member capable of absorbing shocks such as rubber, and the shape thereof may be formed in the same shape as the coupling guide 120.

In addition, the second sealing part 220 is integrally connected to the first sealing part 210 and disposed on the lower edge of the door 110 and is matched with the front surface of the inner garnish 14, more specifically, the protruding member 15, at the closed position of the door 110.

The second sealing part 220 may be formed of an elastic member in the same manner as the first sealing part 210 and may have a shape corresponding to the lower edge of the door 110.

As shown in FIG. 5, the actuator 300, while being coupled with the rotation shaft part 20 provided in the charging-port door part 100, rotates and moves the charging-port door part 100 to an open or a closed position inside the housing 10.

The rotation shaft part 20 coupled with the actuator 300 is provided with a first coupling part 22 and a second coupling part 24 as shown in enlarged views in FIG. 5.

The first coupling part 22 is disposed so as to surround a panel hinge part 30 fastened through the fastening member 30a at one side of the housing 10 and is rotatably coupled with the panel hinge part 30.

That is, the first coupling part 22 is configured to surround an outer circumferential surface of the panel hinge part 30 fixedly disposed at the inside of the housing 10 so it is possible to rotate with the panel hinge part 30 as a reference when the actuator is driven.

In addition, the second coupling part 24 is connected to the actuator 300 at an opposite side of the housing 10.

Here, since the second coupling part 24 is coupled with the actuator 300 with a hinge in a relatively short distance, it is possible to not only easily transmit rotational force but also reduce an introduction of fluctuation to the rotation shaft part 20.

In addition, the second coupling part 24 transmits to the first coupling part 22 the rotational force generated as the actuator 300 is driven.

In other words, since the second coupling part 24 is directly coupled with the rod 310 extending from the actuator 300, when the rod 310 rotates as the actuator 300 is driven, first, the second coupling part 24 is rotated, and accordingly, the rotational force is transmitted to the first coupling part 22 through the rotation shaft part 20 so that rotation of the first coupling part 22 may be performed together.

Therefore, in a structure of the rotation shaft part 20 according to the present embodiment, since the first coupling part 22 is rotatably coupled with the fixed panel hinge part 30, the fluctuations in left and right or up and down directions of the rotation shaft part 20 having a predetermined length may be regulated.

In addition, when the actuator 300 is driven, the second coupling part 24 rotates. At this time, the first coupling part 22 may also rotate by receiving the rotational force of the second coupling part 24 without an extra individual driving device. Accordingly, while a structural simplification is achieved according to a reduction in the number of parts, it is possible to open and close the charging-port door part 100.

On the other hand, on the basis of the structure described above, a rotational movement of the charging-port door part 100 to a closed position or an open position according to the present embodiment will be described as follows.

Figure 6:
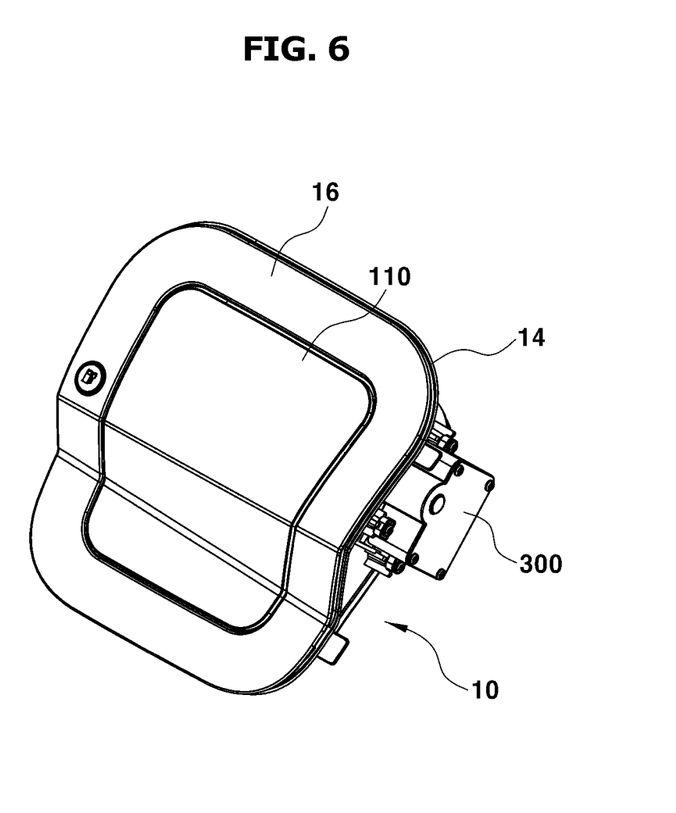
FIGS. 6 to 9 are views in order to show an operation of the charging-port door part for the charging door device for the vehicle according to an embodiment of the present disclosure.
Figure 7:
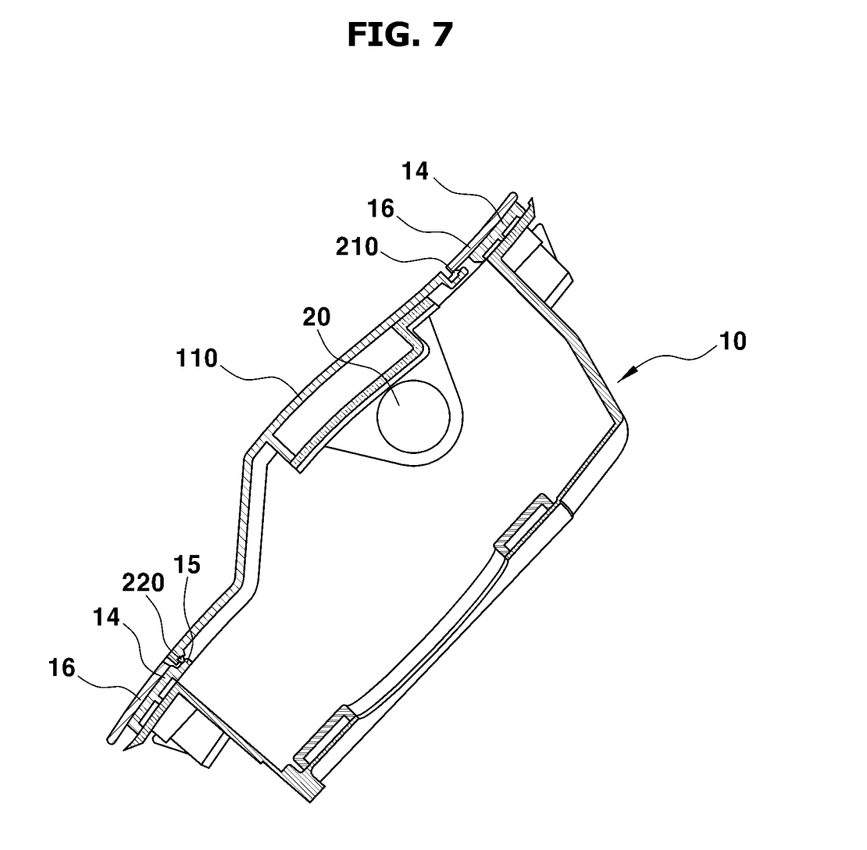

As shown in FIGS. 6 and 7, when the charging-port door part 100 is positioned at the closed position, the upper edge of the door 110, which is preset as the upper side on the basis of a coupling position of the rotation shaft part 20, and more specifically, the first sealing part 210 coupled with the coupling guide 120, becomes matched with the stepped surface A on the rear surface of the outer garnish 16.

In addition, the lower edge of the door 110, corresponding to the lower side on the basis of the coupling position of the rotation shaft part 20, becomes matched with the front surface of the protruding member 15 of the inner garnish 14 in a state in which the second sealing part 220 is coupled therewith.

Accordingly, the charging-port door part 100 is latchedly positioned on the inner garnish 14 and the outer garnish 16, thereby being allowed to be fixed in a closed state at the front of the housing 10.

Here, in order to open the door 110 so as to allow the charging gun to be inserted into the charging part, the actuator 300 may be driven first.

Figure 8:
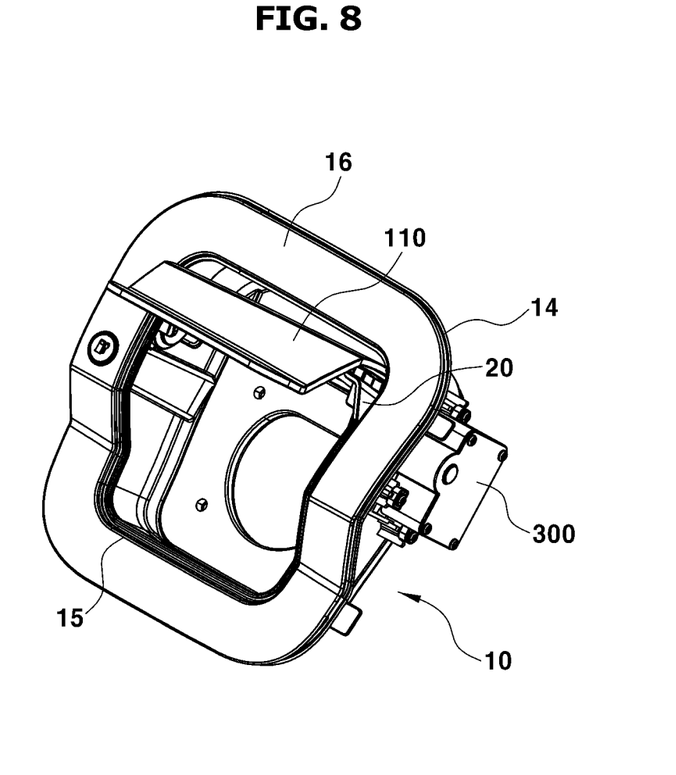
Figure 9:
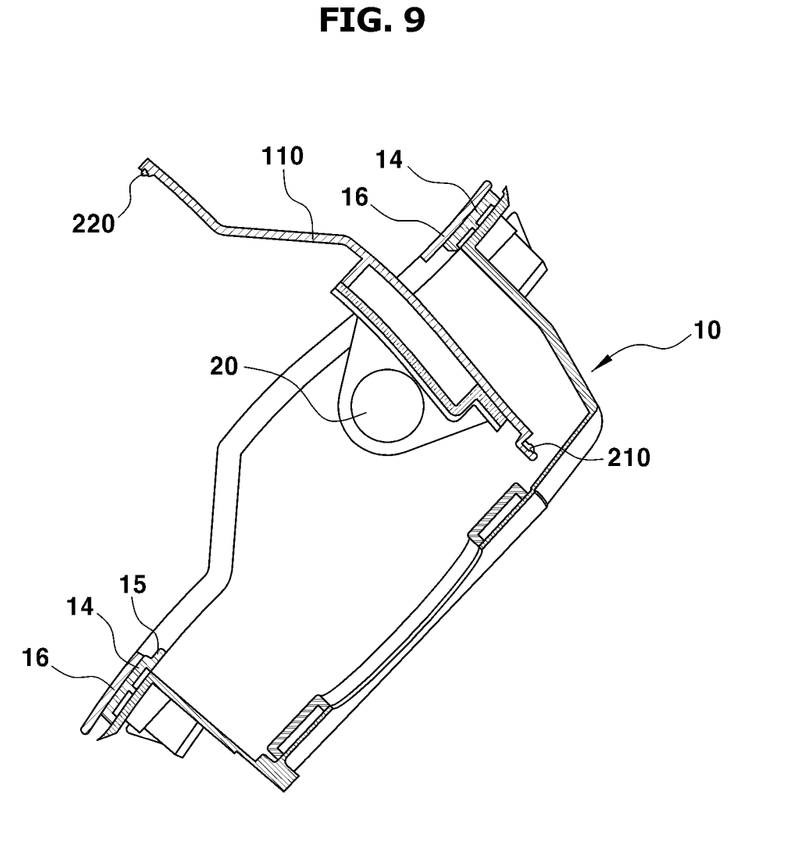

In this way, when the actuator 300 is driven, the rod 310 rotates, and the second coupling part 24 coupled with the rod 310 rotates along with one direction. Accordingly, the rotational force is transferred to the first coupling part 22 connected through the rotation shaft part 20 inside the housing 10 so that the door 110 moves to the open position, as shown in FIGS. 8 and 9.

In this case, the upper edge of the door 110 is inserted into the inner side of the housing 10, and the lower edge of the door 110 protrudes to the outside of the housing 10 so as to correspond thereto.

To summarize, the rotation shaft part 20, which has a position level to an extent not covering the charging part inside the housing 10, partitions the door 110 into the upper or lower part, and the door 110 is structured, when being rotatably moved to the open position, to allow only the lower edge thereof to protrude to the outside of the housing. As a result, the area of the door 110, protruding to the outside of the housing, may be minimized, and accordingly, damage due to collision with the charging gun used for charging may be prevented from occurring.

When the charging door is opened by an operation of the actuator, an upper-end part of the charging door, which is matched with a rear surface of the outer garnish, is allowed to be inserted into the inner side of the housing by rotation, and only a lower-end part of the charging door, which is matched with a front surface of the inner garnish, is allowed to protrude to the outside of the housing. As a result, embodiments of the present disclosure have an effect of reducing an area of the charging door protruding to the outside.

Accordingly, in embodiments of the present disclosure, when the charging door is opened for charging, the protruding area may be reduced, so that damage due to collision with the charging gun may be prevented in advance.

The present disclosure has been described with reference to the embodiment(s) shown in the drawings, but such embodiment(s) is only exemplary. Accordingly, various modifications may be made therefrom by those of ordinary skill in the art, and it will be understood that the various modifications may be configured by optionally combining all or part of the embodiment(s). In addition, in the case of the present disclosure, it has been described that it is applied only to the electric vehicle having the charging-port, but the present disclosure may be applied to vehicles other than the electric vehicles. Therefore, the true technical protection scope of the present disclosure should be determined by the technical spirit of the appended claims.

What is claimed is:

1. A charging door device for a vehicle, the charging door device comprising:
   a charging-port door part configured to shield a charging part and to be rotatably coupled in a housing provided with the charging part; and
   an actuator coupled with a rotation shaft part provided in the charging-port door part and configured to rotatably move the charging-port door part to an open position or a closed position,
   wherein the rotation shaft part comprises:
   a first coupling part rotatably coupled with a panel hinge part; and
   a second coupling part configured to transfer a rotational force generated by the actuator to the first coupling part.

2. The charging door device of claim 1, wherein the housing comprises:
   a body having the charging part located therein and the actuator coupled therewith; and
   a garnish coupled with a front surface edge of the body.

3. The charging door device of claim 2, wherein the garnish comprises:
   an inner garnish coupled with the front surface edge of the body; and
   an outer garnish coupled with a front surface of the inner garnish.

4. The charging door device of claim 3, wherein the outer garnish is formed in the same shape as the inner garnish and is coupled such that a step is formed between the outer garnish and an upper side of the inner garnish.

5. The charging door device of claim 3, wherein the outer garnish comprises a plurality of clips at positions facing the inner garnish, wherein the inner garnish comprises latching protrusions configured to allow the plurality of clips to be latched therewith, wherein the outer garnish is detachably coupled with the front surface thereof.

6. The charging door device of claim 3, wherein the charging-port door part comprises:
   a door having a shape corresponding to an inner shape of the outer garnish and coupled with the rotation shaft part at a rear surface thereof; and
   a coupling guide protrudingly formed along an upper edge of the door to be disposed on an upper side relative to a coupling position of the rotation shaft part.

7. The charging door device of claim 6, further comprising a sealing member coupled with the charging-port door part and configured to form a watertight structure for the housing.

8. The charging door device of claim 7, wherein the sealing member comprises:
- a first sealing part coupled with the coupling guide and disposed on the upper edge of the door, the first sealing part being matched with a rear surface of the outer garnish at a closed position of the door; and
- a second sealing part integrally connected to the first sealing part and disposed on a lower edge of the door, the second sealing part being matched with a front surface of a protruding member protrudingly formed inward along a lower edge of the inner garnish at the closed position of the door.

9. The charging door device of claim 1, wherein
- the first coupling part is configured to surround the panel hinge part fixed by being fastened at a first side of the housing and rotatably coupled with the panel hinge part, and
- wherein the second coupling part is connected to the actuator at a second side of the housing.

10. The charging door device of claim 1, wherein, when the charging-port door part is rotatably moved to the open position, an upper-end part thereof is inserted into an inner side of the housing, and a lower-end part thereof protrudes to an outside of the housing.

11. A vehicle comprising:
- a vehicle body;
- a charging part provided in a housing; and
- a charging door device coupled to the vehicle body, the charging door device comprising:
  - a charging-port door part rotatably coupled in the housing and configured to shield the charging part;
  - a sealing member coupled with the charging-port door part and configured to form a watertight structure for the housing; and
  - an actuator coupled with a rotation shaft part provided in the charging-port door part and configured to rotatably move the charging-port door part to an open or a closed position,
- wherein the rotation shaft part comprises:
  - a first coupling part rotatably coupled with a panel hinge part; and
  - a second coupling part configured to transfer a rotational force generated by the actuator to the first coupling part.

12. The vehicle of claim 11, wherein the housing comprises:
- a body having the charging part located therein and the actuator coupled therewith; and
- a garnish coupled with a front surface edge of the body.

13. The vehicle of claim 12, wherein the garnish comprises:
- an inner garnish coupled with the front surface edge of the body; and
- an outer garnish coupled with a front surface of the inner garnish.

14. The vehicle of claim 13, wherein the outer garnish is formed in the same shape as the inner garnish and is coupled such that a step is formed between the outer garnish and an upper side of the inner garnish.

15. The vehicle of claim 13, wherein the outer garnish comprises a plurality of clips at positions facing the inner garnish, wherein the inner garnish comprises latching protrusions configured to allow the plurality of clips to be latched therewith, wherein the outer garnish is detachably coupled with the front surface thereof.

16. The vehicle of claim 13, wherein the charging-port door part comprises:
- a door having a shape corresponding to an inner shape of the outer garnish and coupled with the rotation shaft part at a rear surface thereof; and
- a coupling guide protrudingly formed along an upper edge of the door to be disposed on an upper side relative to a coupling position of the rotation shaft part.

17. The vehicle of claim 16, wherein the sealing member comprises:
- a first sealing part coupled with the coupling guide and disposed on the upper edge of the door, the first sealing part being matched with a rear surface of the outer garnish at a closed position of the door; and
- a second sealing part integrally connected to the first sealing part and disposed on a lower edge of the door, the second sealing part being matched with a front surface of a protruding member protrudingly formed inward along a lower edge of the inner garnish at the closed position of the door.

18. The vehicle of claim 11,
- wherein the first coupling part is configured to surround the panel hinge part fixed by being fastened at a first side of the housing and rotatably coupled with the panel hinge part, and
- wherein the second coupling part is connected to the actuator at a second side of the housing.

19. A method of operating a charging door device for a vehicle, the method comprising:
- rotatably coupling a charging-port door part in a housing provided with a charging part to shield the charging part;
- rotatably moving the charging-port door part to an open position or a closed position using an actuator coupled with a rotation shaft part provided in the charging-port door part;
- rotatably coupling a first coupling part configured to surround a panel hinge part fixed by being fastened at a first side of the housing to the panel hinge part; and
- transferring to the first coupling part a rotational force generated by the actuator using a second coupling part connected to the actuator at a second side of the housing.

20. The method of claim 19, wherein rotatably moving the charging-port door part to the open position comprises:
- inserting an upper-end part of the charging-port door part into an inner side of the housing; and
- protruding a lower-end part of the charging-port door part to an outside of the housing.

* * * * *